April 30, 1968     W. H. BONNER, JR     3,381,077
METHOD FOR INFLATING CLOSED CELL FOAMS
Filed Jan. 26, 1966     3 Sheets-Sheet 1

INVENTOR
WILLARD HALLAM BONNER, JR.
BY
ATTORNEY

INVENTOR
WILLARD HALLAM BONNER, JR.

BY
ATTORNEY 3,381,077
METHOD FOR INFLATING CLOSED CELL FOAMS
Willard Hallam Bonner, Jr., Wilmington, Del., assignor to E. I. du Pont de Nemours and Company, Wilmington, Del., a corporation of Delaware
Filed Jan. 26, 1966, Ser. No. 523,077
9 Claims. (Cl. 264—321)

This invention relates to resilient, pneumatic, polymeric foams having closed cells, and more particularly to an improved process for introducing impermeant inflatant gases to the closed cells; i.e. gases which permeate the cell-walls so slowly as to be substantially permanently retained.

Foamed materials having closed cells are increasingly employed in a variety of applications because they provide thermal and acoustical insulation, shock absorption, resilient cushioning, and buoyancy—among other provisions. There are, however, certain disadvantages associated with most known closed-cell foams in many of these applications, which disadvantages relate primarily to their inability either to retain gases within their cells under compressive load or to regain their fully inflated volume after removal of a compressive load. Thus, most resilient closed-cell foams contain only air within their cells, which limits the equilibrium pressure within the cells to no more than that of the ambient atmosphere. The pneumaticity of such foams is, therefore, rather limited. Under compression, air escapes from closed cells by permeating the cell-walls with the result that the foamed structure is permanently reduced in volume. The blowing agents employed in forming resilient foamed structures may be temporarily retained within the cells to create an intermediate, fully inflated foam, but they are often even more permeant than air and rapidly escape to spontaneously collapse the structure to a foam of higher density. It is desirable to be able to reinflate collapsed foams, or that they be spontaneously reinflatable. Alternatively, the gas content of a partially or fully inflated foam is desirably replaced, at least in part, by a relatively impermeant gas.

It is particularly desirable that closed-cell foams contain gaseous inflatants which have essentially zero permeability coefficients as compared to air. Such gaseous inflatants are herein referred to as impermeant inflatants. By "essentially zero permeability coefficient" is means that impermeant inflatants permeate cell-walls at a rate which is at least 2 and preferably 4 or more orders of magnitude lower than for air under the same conditions. Thus, they are substantially permanently retained within the closed cells. Air and other gases can be simultaneously contained within the cells; but as long as impermeant inflatant is contained, the cells cannot be completely collapsed under compressive loading without rupture of the closed cells. Moreover, presence of impermeant inflatant in the cells creates an osmotic gradient for the inward permeation of air until internal and external fugacities of air, i.e., apparent vapor pressures, are equal. This equilibrium condition is characterized by a combined pressure of air and impermeant inflatant within the closed cells which is greater than the ambient atmospheric pressure. Both spontaneous reinflatability and higher levels of pneumaticity are thereby provided.

A method described in U.S. application S.N. 302,495, filed August 16, 1963, now U.S. Patent No. 3,344,221, for introducing impermeant inflatant to the closed cells of a resilient foamed structure is a process in which the structure: (1) is immersed in a fluid comprising impermeant inflatant, at a pressure no less than about atmospheric, until a partial pressure of impermeant inflatant within the cells is established, and (2) is exposed thereafter to a gaseous atmosphere, e.g., air, which permeates the cell-walls much more rapidly than the impermeant inflatant and which has an external partial pressure greater than its partial pressure within the closed cells. When the fluid of the first step is composed only of impermeant inflatant, this process is usually prohibitively slow, as will become more apparent hereinafter. The fluid is frequently additionally comprised of a volatile plasticizing fluid. The plasticizing fluid, as more fully described hereinafter, is a non-solvent for the polymer comprising the cellular structure, at least for temperatures at or below its atmospheric boiling point. Most importantly, however, it permeates the cell-walls very rapidly and plasticizes them. While plasticized, the cell-walls are temporarily very much more permeable so that even the impermeant inflatant in the fluid readily permeates into the cells. On exposure of the thusly treated cellular structure to air, the plasticizing fluid is quickly volatilized so that the cell-walls are no longer either plasticized or enhanced in permeability; and impermeant inflatant is retained within the cells.

While the above process makes practicable the introduction of impermeant inflatant to the cellular structure, it is not without disadvantages. Plasticizing fluids perform their function most efficiently at elevated temperatures, i.e., at or not far below their normal boiling points. Preferred impermeant inflatants are, however, so thermodynamically dissimilar to the plasticizing fluids as to be only very slightly soluble therein at the elevated temperatures, unless pressures considerably greater than atmospheric are employed. The low concentration of impermeant inflatant is directly translatable to a low driving force for its inward permeation. Reduction of the temperature of the fluid to increase the concentration of impermeant inflatant simultaneously diminishes the effectiveness of the plasticizing fluid. In order to introduce desirably great quantities of impermeant inflatant, therefore, relatively large immersion times are required. Prolonged exposure to plasticizing fluid is undesirable since it is known to increase the permeability of the subsequently unplasticized polymeric cell-walls. Moreover, the longer the immersion time, the greater are both processing and equipment costs.

This invention decreases the time required for introducing a given quantity of impermeant inflatant within the closed cells of a cellular, resilient, polymeric structure. It also provides an improved process for the re-inflation of collapsed closed-cell foam structures. Further, it provides a method for replacing the gas content of a closed-cell foam structure with an impermeant inflatant. Still further, it provides a practicable process for introducing impermeant inflatant at ambient atmospheric pressure. This invention further provides foam structures which are durably pneumatic under compressive loads and which spontaneously re-inflate upon removal of the load. Other provisions of this invention will be obvious from the remainder of this specification.

These provisions result from the following invention which is an improved process for introducing impermeant inflatant to the closed cells of a low-density, polymeric, cellular structure which comprises (1) a first step in which the cellular structure is exposed to a non-solvent, volatile, plasticizing fluid at a temperature equal to or less than its normal boiling point, (2) a second step in which the structure, while still wet with and plasticized by the plasticizing fluid, is transferred to a fluid bath comprising impermeant inflatant, and (3) at least a third step in which the structure is exposed to an air atmosphere. Air has a permeant rate through unplasticized cell walls which is lower than that of the plasticizing fluid but considerably greater, e.g. at least 100 times, than that of the impermeant inflatant. Preferably a fourth step intermediate between steps (2) and (3) is employed in which the cellular structure is bathed in an inert nonsolvent fluid, e.g., water or steam or other non-plasticizing fluid, which quickly removes from the surfaces of the structure excess plasticizing fluid and impermeant inflatant and which can carry them to a solvent separation and recovery apparatus.

Figure 3:
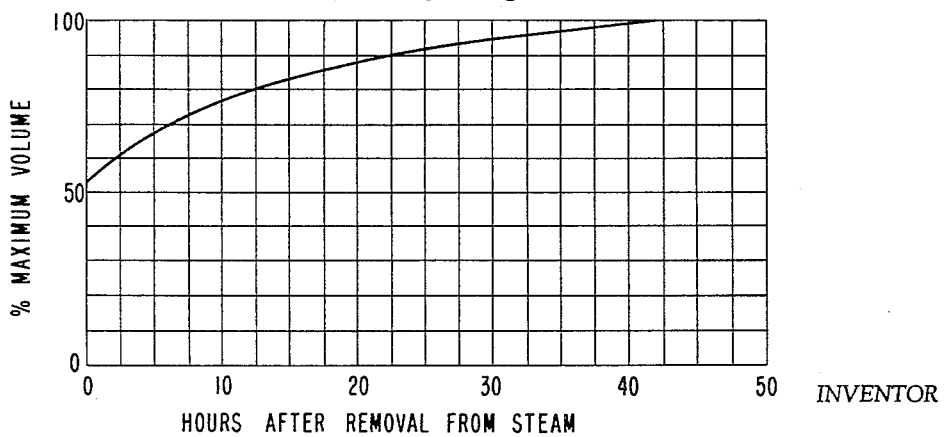

FIGURE 3, relating specifically to Example VIII, is a graphical representation of the rate of air-reinflation at room temperature.

Figure 4:
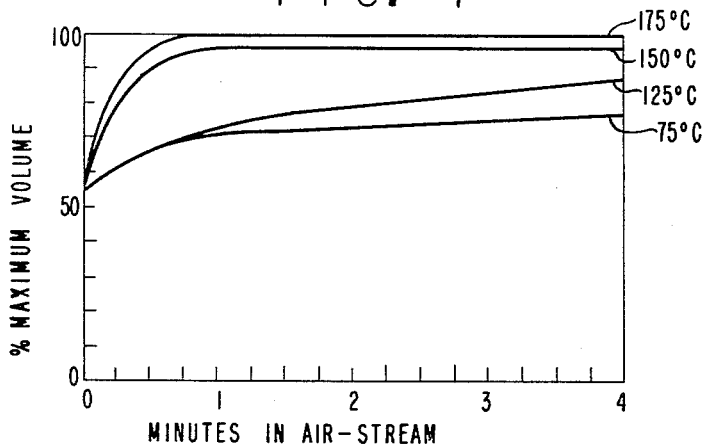

FIGURE 4 shows rate of air-reinflation in heated air, again specific to Example VIII.

Figure 5:
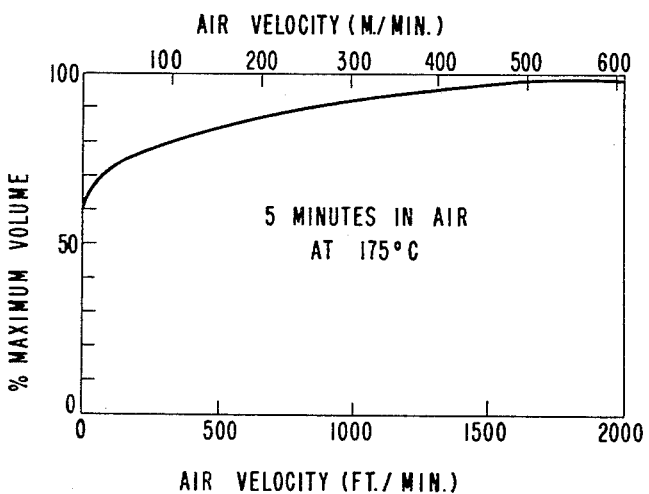

FIGURE 5 shows the effect of air-velocity on the rate of air-reinflation, also specific to Example VIII.

This invention is to be clearly distinguished from primary blowing processes employed to form the cells of a foam. It is concerned neither with forming new cells nor with appreciable stretching of the cell-walls beyond their sizes prior to treatment by this process. Thus, the maximum potential volume of the inflated foam is substantially unchanged by the process except for perhaps a slight distention when the final pressure within the cells becomes superatmospheric. Foams useful in this invention, when fully inflated, are of low density, i.e. density ordinarily between about 0.005 and 0.05 gm./cc. Immediately following their extrusion, they reach a maximum volume in which state the cell-walls solidify to a fixed size. Loss of gas from the cells, or its condensation within the cells, thereafter causes collapse of the structure by wrinkling and folding of the cell-walls to enclose a lower volume. Such collapsed foams, suitably employed in this invention, can have densities as great as 75% of that for the solid polymer of which they are comprised.

Cellular structures for use in this process require certain characteristics and properties. A particularly essential characteristic of a suitable structure is that it have a major proportion of closed cells since open cells cannot confine impermeant inflatant. For practical purposes, visual or microscopic examination usually reveals whether a particular structure has predominantly open or closed cells. Otherwise, the closed-cell content can be determined by the gas displacement method of Remington and Pariser, Rubber World, May 1958, p. 261, modified by operating at as low a pressure differential as possible to minimize volume changes of the resilient structure.

A further essential characteristic of foams useful in this process is that they be resilient such that substantial deformation occurs under externally applied pressures or compressive loadings. Generally, this requirement is satisfied if the fully inflated cellular structure, i.e., having at least atmospheric internal pressure and few, if any, wrinkled or buckled cell-walls, is yieldable such that its volume can be reduced by at least 10% under a load of 10 p.s.i. (0.70 kg./cm.²) sustained for 1 second with regain to at least 50% of its original volume on release of the load. Foams which do not compress to this extent are too rigid to respond to available pressure differentials for inflation by this process.

The cell walls of suitable cellular structures are composed of film-forming, high-molecular-weight polymers, usually synthetic organic polymers. A wide variety of both addition and condensation polymers can form cellular structures with the essential characteristics. Typical of such polymers are polyolefins such as polyethylene and polypropylene, polyamides such as nylon-6, polyesters such as polyethylene terephthalate, and halogenated polymers such as polyvinyl chloride and polychlorotrifluoroethylene, etc. A highly suitable class of cellular structures has small, polyhedral-shaped cells defined by thin film-like cell-walls of the polymer. Thin cell walls are very flexible, contributing greatly to the yieldable nature of the foam structures; and they are readily plasticized to promote inward permeation of impermeant inflatants.

A particularly desirable type of cellular material is the ultramicrocellular structure described in Blades et al. U.S. Patent 3,227,664, issued Jan. 4, 1966. These preferred structures contain at least $10^3$ cells/cc., the average transverse dimension of which cells is ordinarily less than about 1000 microns in the expanded state. Substantially all of the polymer in these structures is present as filmlike cell-walls less than 2 microns thick, and preferably less than 0.5 micron. The thickness of a cell-wall, bounded by intersections with other walls, does not ordinarily vary by more than ±30%; and adjacent walls commonly are of nearly equal thicknesses, usually within a factor of 3. Moreover, the polymer in the cell walls exhibits uniplanar orientation and a uniform texture, as fully defined in the aforementioned Blades and White patent. Ultramicrocellular materials, when in a collapsed state, have densities usually in the range from 0.05 to 0.5 gm./cc.; but when fully inflated as, for instance, by the process of this invention, their densities are in the range from 0.005 to 0.05 gm./cc.

One of the features of ultramicrocellular structures is the high degree of molecular orientation of the polymer in the cell-walls, which greatly contributes to the unique strength of these structures. A preferred class of polymers from which to make cellular objects to be subjected to the process of this invention is, therefore, that class which responds to an orienting operation (e.g., drawing of fibers or films) by becoming substantially tougher and stronger. This class is well known in the art and includes, for example, linear polyethylene, stereo-regular polypropylene, nylon-6, and polyethylene terephthalate. Another preferred class of polymers is that class with particularly low permeability coefficients for gases, such as polyethylene terephthalate and polyvinyl chloride.

Candidates for impermeant inflatants should have vapor pressures at normal room temperatures of at least 50 mm. Hg and should be present within the cells in sufficient quantity to provide an internal partial pressure of at least 50 mm. Hg. The impermeant inflatant can be a high vapor-pressure liquid, or solid, present in the cells at equilibrium with its vapor. Preferred impermeant inflatants, however, have atmospheric boiling points less than about 25° C.

The rate of permeation for an inflatant through a given polymer increases as its diffusivity and solubility increase. Accordingly, candidates for impermeant inflatants should have as large a molecular size as is consistent with a sufficiently great vapor pressure, and they should have substantially no solvent power for the polymer. A preferred class of impermeant inflatants is exemplified by compounds whose molecules have chemical bonds different from those of the confining polymer, a low dipole moment, and a very small atomic polarizability.

Suitable impermeant inflatants are selected from the group consisting of sulfur hexafluoride and saturated aliphatic or cycloaliphatic compounds having at least one fluorine-to-carbon covalent bond and wherein the number of fluorine atoms preferably exceeds the number of carbon atoms. Preferably these inflatants are perhaloalkanes or perhalocycloalkanes in which at least 50% of the halogen atoms are fluorine. Although these inflatants may contain ether-oxygen linkages, they are preferably free from nitrogen atoms, carbon-to-carbon double bonds, and reactive functional groups. Specific examples of impermeant inflatants include sulfur hexafluoride, perfluorocyclobutane, sym-dichlorotetrafluoroethane, perfluoro-1,3-dimethylcyclobutane, perfluorodimethylcyclobutane mixtures, 1,1,2-trichloro-1,2,2-trifluoroethane,

chlorotrifluoromethane, and dichlorodifluoromethane. Particularly preferred because of its inertness, appreciable molecular size, very low permeability rate, and lack of toxicity is perfluorocyclobutane with an atmospheric boiling point of about −6° C.

Basically this invention resides in the discovery that impermeant inflatants are more quickly and efficiently introduced to the closed cells of a cellular structure if the cell walls are plasticized before exposure to a fluid bath comprising impermeant inflatant (hereinafter this fluid bath is named the boosting fluid, for brevity). Thus optimum conditions for plasticization and for the introduction of impermeant inflatants to the cells can separately be provided.

Figure 1:
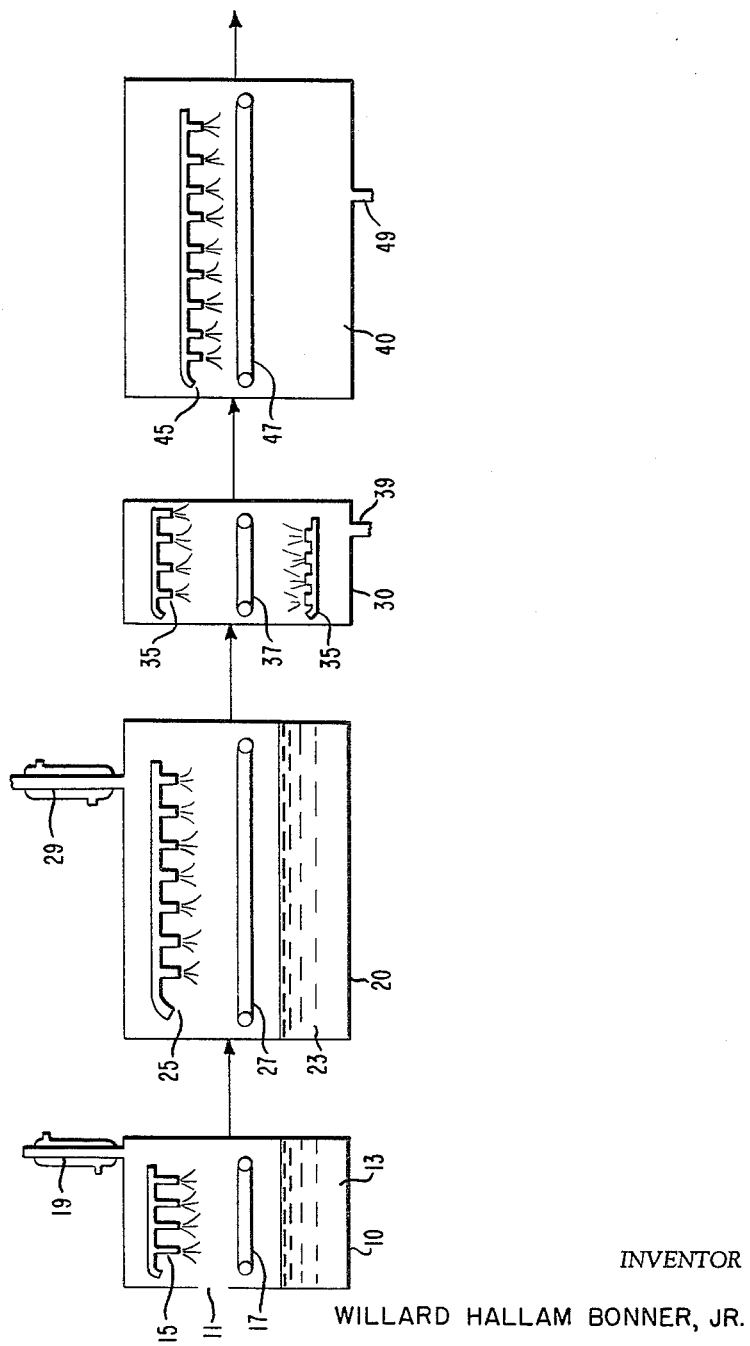
FIGURE 1 is a schematic representation in elevation of a preferred process according to this invention.

With reference to FIGURE 1, a preferred embodiment of the inventive process will now be discussed in detail. A closed-cell, polymeric, cellular structure is fed through a suitable baffled port 11 into vessel 10 through which it is conveyed by, for example, conveyor belt 17. The cellular structure (not shown, for clarity) may be fed through port 11 directly from its forming device, e.g., an extruder; or it may be from a supply of previously formed foam. On entry to port 11, it may be inflated already to densities of 1% or less of that for the solid polymer or collapsed to densities as great as 75% of that for the solid polymer. Vessel 10 contains a refluxing, boiling, plasticizing fluid 13 which is pumped through spray nozzles 15 and sprayed onto the advancing cellular structure. An atmospheric refluxing condenser 19 provides atmospheric pressure without loss of fluid. Length of vessel 10 and speed of conveyor belt 17 are adjusted to produce a residence time sufficient for the necessary degree of cell-wall plasticization. It is frequently preferred to immerse the cellular structure in plasticizing fluid 13.

While still wet with plasticizing fluid 13, the cellular structure is transferred to vessel 20 containing a boiling, refluxing, booster fluid 23 composed of impermeant inflatant dissolved in a plasticizing fluid, preferably the same one contained in vessel 10. An atmospheric refluxing condenser 29 is similarly provided. Booster fluid 23 is pumped through spray nozzles 25 and sprayed onto the advancing cellular structure. Alternatively the structure is immersed in rather than sprayed by booster fluid 23. Again, length of vessel 20 and speed of conveyor belt 27 are adjusted to cause the desired amount of impermeant inflatant to enter the cells of the structure. The cellular structure enters vessel 20 with an excess of adhering plasticizing fluid 13 and leaves with an excess of booster fluid 23. Thus means (not shown) for adjusting liquid levels in vessels 10 and 20 must be provided.

If the cellular structure leaving vessel 20 is immediately exposed to air, excess fluid 23 is difficult to reclaim. Thus, though not required in this improved process, vessel 30 is preferably provided for stripping off excess fluid 23 so that it may readily be reclaimed and for more rapidly removing plasticizing fluid so as to quickly terminate the temporarily enhanced permeability of the cell-walls. A non-solvent fluid is sprayed onto the cellular structure, being conveyed by belt 37, through suitable nozzles 35. Water is preferred either in liquid form at about 25–100° C., or as steam at about 100° C. Other stripping fluids may, of course, be used in place of water, but, since it is suitable, water is obviously preferred. A drain, such as indicated by pipe 39, is provided for conveying collected fluid to a solvent-recovery system (not shown). On leaving vessel 30, the cellular structure has impermeant inflatant trapped within its cells and only a minor amount, if any, of plasticizing fluid in the cell walls.

From vessel 30, the cellular structure can be collected in an air-free space where it becomes and remains collapsed until a later time when it will re-inflate on exposure to air. Or, the structure can press directly into the ambient atmosphere where, under the osmotic pressure gradient provided by impermeant inflatant within the cells, air will permeate slowly into the cells until an internal superatmospheric pressure is attained which fully inflates the foam and renders it durably pneumatic. Substantially complete volume-inflation, though not necessarily equilibrium pressures, in ambient air requires from about 12 minutes to about 60 hours, depending on size of the structure and on its polymeric composition.

In a preferred process the cellular structure passes directly from vessel 30 into vessel 40 where it is exposed to high-velocity heated air jetted from nozzles 45. Outlet(s) 49 is provided for recirculating the heated air, and also provided is a means 47 for conveying the cellular structure. Air temperature is preferably in the range from 80 to 175° C., the time required for substantially complete volume-inflation decreasing with increasing temperature. Preferably the air temperature exceeds the glass-transition temperature of the polymer, but it is less than the polymer's melting temperature. The time for re-inflation also decreases with increasing velocity of the heated air, velocities from 100 to 2000 ft./min. (30.5 to 610 m./min.) being preferred. From about 15 seconds to about 10 minutes of exposure to heated air ordinarily suffices for obtaining substantially complete volume-inflation, but equilibrium pressure usually requires continued exposure to ambient air. Since substantially equilibrium pressure is spontaneously attained in air, the preferred rapid process according to this invention provides: (1) sufficient impermeant inflatant within the cells to promote spontaneous pressure equilibrium and (2) long enough exposure to heated air to achieve inflation to substantially the maximum volume.

The pasticizing fluid for use in the process of this invention (e.g., in vessel 10) should have relatively small molecules in order to promote permeation through the cell walls and must plasticize, e.g., swell, the cell walls without dissolving other than very minor proportions of the polymer and below the fluid's atmospheric boiling point. At higher temperatures, and under pressure, most suitable plasticizing fluids dissolve at least a significant portion of the polymer. Since it must be readily and rapidly volatized on exposure to air, the plasticizing fluid should have an atmospheric boiling point of less than about 85° C. The rate of plasticization increases with increasing temperature; so operation at its boiling point is preferred. Prolonged exposure to plasticizing fluid can change the crystalline structure and molecular orientation of the polymer in the cell-walls, usually increasing their permeability; so the shortest adequate plasticizing times are employed, usually in the range from 5 to 60 seconds. Suitable plasticizing fluids for foams of polyethylene terephthalate include methylene chloride, chloroform, ethylene chloride, and dichlorofluoromethane. Methylene chloride with a boiling point of about 40° C. is preferred not only because it is optimum in the above properties but also because it is relatively inexpensive, nontoxic except in extreme exposures, and substantially nonflammable. Additionally useful plasticizing fluids for other polymers include trichlorofluoromethane, methanol, and even water.

The booster fluid (e.g., in vessel 20) comprises impermeant inflatant, and preferably a solution of impermeant inflatant in plasticizing fluid since the latter more rapidly promotes inward permeation of inflatant. The perfluorocyclobutane/methylene chloride system is particularly preferred. Liquid booster fluids are more effective than gaseous ones, and are preferred.

At atmospheric pressure, perfluorocyclobutane and methylene chloride form a constant-composition liquid solution boiling at about −6° C. Its composition is about 91% methylene chloride and 9% perfluorocyclobutane, by weight. If perfluorocyclobutane is present in excess of this ratio, a separate perfluorocyclobutane-rich liquid phase forms. Since thermodynamic activity of perfluorocyclobutane is identical in both of these liquid phases, the one involving mostly the relatively inexpensive methylene chloride is preferred. At higher temperatures the permeability coefficient for perfluorocyclobutane increases, but its solubility in the plasticizing fluid simultaneously decreases at a rate which tends to override the increase in permeability coefficient and usually results in diminished transport through the cell walls unless pressure is increased significantly. Thus, the preferred boosting fluid has all the optimum characteristics, including extremely facile regulation of composition and temperature. Exposure times in this fluid are characteristically from 1 to 10 minutes when from about 10 to 15 grams of perfluorocyclobutane per 100 grams of polymer are to be introduced to the cells. Combined with the few seconds of exposure to plasticizing fluid, this time is only one-half or less the total exposure required to obtain a given level of perfluorocyclobutane concentration using no pre-plasticization in boiling methylene chloride. Although this process provides rapid boosting with impermeant inflatant at the desired atmospheric pressure, boosting is still more rapid if higher temperatures and correspondingly increased pressures are employed.

It is apparent that a cellular structure for treatment by the process of this invention should have at least one small linear dimension if its cells are to be provided with impermeant inflatant throughout the whole volume of the structure and if the structure is thereby to obtain its maximum volume. Preferably the cellular structure is in the form of a filament, a ribbon, a sheet, or a block having at least one linear dimension less than about 0.25 inch (0.635 cm.). Application of this process is, however, free from limitations in size of the cellular structure.

The following examples illustrate and clarify this invention, but, since many variations thereof are obvious, they are not intended to limit the invention except as provided in the appended claims. All parts and percentages hereinafter are by weight unless otherwise specified.

EXAMPLE I

A previously prepared supply of ultramicrocellular polyethylene terephthalate filament was available. Although the precise conditions for its preparation were not recorded with the results given, they were substantially the same as in subsequent examples employing polyethylene terephthalate. Briefly immersed in boiling methylene chloride and then left in air for one day until solvent-free, it collapsed to a stable density of about 0.5 gm./cc. Denier of the filament was about 15, and it was obtained by extruding a solution of the polymer in methylene chloride through an orifice 0.003 inch (0.076 mm.) in diameter.

Portions of the filamentous product were post-inflated as follows. Each was immersed for 30 seconds in plasticizing fluid (liquid methylene chloride at room temperature), removed and quickly blotted with paper towels to remove excess liquid, immersed for the times shown in Table I in the boiling impermeant inflatants shown, and dried in an air oven at 100° C. for the drying time shown.

TABLE I.—PREPLASTICIZED POST-INFLATION OF POLYEHTYLENE TEREPHTHALATE ULTRAMICROCELLULAR FILAMENT

| Impermeant inflatant | Minutes in boiling impermeant inflatant | Final Density (gm. cc.) |
| --- | --- | --- |
| Perfluorocyclobutane | 5 | 0.029 |
|  | 30 | 0.050 |
| Dichlorodifluromethane | 0.5 | 0.53 |
|  | 5 | 0.016 |
|  | 30 | 0.016 |
| Sym-dichlorotetrafluoroethane | 5 | 0.018 |
|  | 30 | 0.015 |

From the listed densities of the dried products, it is obvious that about 0.016 gm./cc. corresponded to full inflation. This treatment, for the immersion times shown, failed to introduce enough of the preferred perfluorocyclobutane to produce full inflation, even though very great density reduction was achieved.

EXAMPLE II

This example illustrates the increased efficiency and speed of post-inflation when a pre-plasticization step is employed.

Ultramicrocellular filaments were prepared by extruding a foamable solution at 217° C. and 705 p.s.i.g. (49.6 kg./cm.² gage) into the ambient atmosphere through an orifice 0.015 inch (0.381 mm.) in diameter and length. The foamable solution contained 6 parts of polyethylene terephthalate (relative viscosity=55.6) and 4 parts of methylene chloride. The extruded filaments were fully inflated near the extrusion orifice, but soon thereafter collapsed to a density of about 0.088 gm./cc.

Relative viscosity (RV), as used herein, is the ratio of absolute viscosities at 25° C. of solution and solvent, the solvent containing 7 parts of 2,4,6-trichlorophenol and 10 parts of phenol, and the solution containing 8.7% of polymer in the same solvent.

Different portions of these filaments were post-inflated according to this invention by: (1) immersing them in plasticizing fluid, (2) immersing them in booster fluid, and (3) exposing them for 10 minutes to air at 125° C. with an air-velocity of about 400 ft./min. (121.9 m./min.). The plasticizing fluid was boiling methylene chloride at about 40° C. The booster fluid was the perfluorocyclobutane-rich liquid phase of a liquid, two-phase mixture of perfluorocyclobutane in methylene chloride, the mixture boiling at about −6° C. at atmospheric pressure. Combined immersion times in the two fluids was 15 minutes. The fully inflated filaments were about 0.052 inch (1.32 mm.) in diameter at a density of about 0.016 gm./cc. Results are shown in Table II.

The amount of impermeant inflatant (perfluorocyclobutane, here) retained within the closed cells of an inflated structure was determined by weighing an inflated sample, reducing it to a dense film between the hot plates of a press, and then weighing the film. Ratio of the difference in weights to the weight of the film, times 100, is the quantity of impermeant inflatant retained in grams per 100 grams of polymer. Temperature of the hot plates and time of pressing were selected not to cause detectable polymer degradation. For polyethylene terephthalate, short exposure to 275° C. was found satisfactory. For brevity, the unit "gm./100 gm." is used hereinafter to identify these test results.

TABLE II.—FIFTEEN-MINUTE COMBINED IMMERSION TIMES

| Test | Minutes in— | | Perfluorocyclobutane (gm./100 gm.) | Stable density (gm. cc.) |
| --- | --- | --- | --- | --- |
|  | Plasticizing Fluid | Booster Fluid |  |  |
| A | 0 | 15 | 15.4, 17.4, 16.5 Avg.=16.4 | 0.015, 0.016 |
| B | 5 | 10 | 17.7, 22.0, 18.8 Avg.=19.5 | 0.017, 0.016 |
| C | 10 | 5 | 17.3, 21.2, 18.8 Avg.=19.1 | 0.015, 0.014 |

Multiple test determinations are presented as an indication of the precision obtained. It is apparent that, for constant combined immersion times, more impermeant inflatant is introduced if at least a portion of the time is used for preplasticization. Comparison tests on the same filaments, similar to Test A only for longer durations, showed that about 30 minutes of immersion were required to introduce about the same levels of impermeant inflatant achieved in Tests B and C.

EXAMPLE III

This example substantially repeats Example II. The ultramicrocellular polyethylene terephthalate filaments were prepared identically except that RV of the polymer was 50.5, solution temperature was 213° C., and extrusion pressure was 680 p.s.i.g. (47.8 kg./cm.² gage). The collapsed filaments had a density of about 0.052 gm./cc.

Post-inflation was performed under the same conditions as for Example II, too, except that the booster fluids was the methylene chloride-rich liquid phase, which should be thermodynamically equivalent. The dry and stable filaments were about 0.061 inch (1.55 mm.) in diameter at a density of about 0.029 gm./cc. Test results are presented in Table III.

TABLE III.—FIFTEEN-MINUTE COMBINED IMMERSION TIMES

| Test | Minutes in— | | Perfluorocyclobutane (gm./100 gm.) | Minutes required in booster fluid only |
|---|---|---|---|---|
| | Plasticizing Fluid | Booster Fluid | | |
| D | 0 | 15 | 12.6, 12.1, 13.6, 14.3 Average=13.2 | |
| E | 1 | 14 | 20.3, 19.2, 21.0, 19.7 Average=20.0 | About 60 |
| F | 2 | 13 | 17.7, 16.1, 16.5, 15.9 Average=16.6 | 23–29 |
| G | 5 | 10 | 17.6, 17.8, 16.3, 17.2 Average=17.2 | 23–29 |
| H | 7 | 8 | 16.2, 16.4, 15.3, 16.4 Average=16.1 | 17–23 |
| I | 10 | 5 | 15.7, 13.1, 14.6 Average=14.5 | 15–17 |
| J | 12 | 3 | 12.2, 9.7, 12.3, 12.6 Average=11.7 | 7–15 |

It is apparent that short plasticizing times (approximately 1 minute) result in greater amounts of retained impermeant inflatant for combined immersion times of 15 minutes. The last column presents immersion times required to obtain the same level of perfluorocyclobutane without preplasticization. For test E, about four times as long total immersion is indicated. Proceeding from test F downward it is obvious that increasing time in plasticizing fluid at the expense of exposure to booster fluid decreases efficiency until, in test J, combined immersion times actually exceed the time required using only booster fluid.

EXAMPLE IV

Example III is repeated here in every process detail except that combined exposure times were only 10 minutes. Results are shown in Table IV.

TABLE IV.—TEN-MINUTE COMBINED IMMERSION TIMES

| Test | Minutes in— | | Perfluorocyclobutane (gm./100 gm.) |
|---|---|---|---|
| | Plasticizing Fluid | Booster Fluid | |
| K | 0 | 10 | 10.7, 10.3, 11.5, 10.6 Average=10.8 |
| L | 0.25 | 9.75 | 15.2, 16.7 Average=16.0 |
| M | 0.5 | 9.5 | 16.1, 18.2, 19.4, 19.9 Average=18.4 |
| N | 1.0 | 9.0 | 14.7, 15.3, 14.9, 14.0 Average=14.7 |
| O | 1.5 | 8.5 | 13.9, 14.1 Average=14.0 |
| P | 2.0 | 8.0 | 14.2, 13.8, 14.2, 14.1 Average=14.1 |

Figure 2:
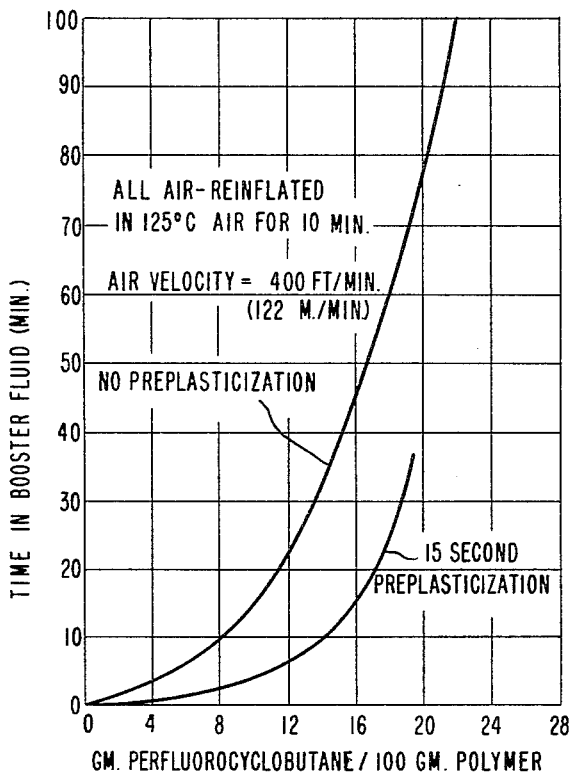
FIGURE 2 is a graphical presentation of the reduction in immersion times resulting from preplasticization.

It is apparent that preplasticization for only 0.5 minute (test M) almost doubles the amount of perfluorocyclobutane introduced without preplasticization (test K). FIGURE 2 summarizes results for 40 post-inflation experiments on a similar filamentous product, half with 15 sec. immersion in the plasticizing fluid and the other half with no preplasticization. The benefit of preplasticization is readily seen by comparing times required in booster fluid to obtain a given level of inflatant concentration.

In this example, ultramicrocellular filament was extruded directly into the vapor atmosphere over the plasticizing fluid (methylene chloride boiling at atmospheric pressure). Its extrusion velocity was such that it became immersed in the liquid methylene chloride in considerably less than 1 second.

The ultramicrocellular filament was prepared as follows. A 1-liter pressure vessel was charged with:

Polyethylene terephthalate (RV=39.7)—400 gm.
Methylene chloride (at room temp.)—300 ml.
Perfluorocyclobutane—40 gm.

While being slowly rotated end-over-end, the sealed pressure vessel was heated over a period of 1 hour and 50 minutes to 220° C., then cooled in 2 hours and 25 minutes to 180° C. A nitrogen ballast pressure of 600 p.s.i.g. (42.2 kg./cm.$^2$ gage) was then applied to the top of the solution column, and solution was extruded downward into the plasticizing fluid through an orifice 0.012 inch (0.305 mm.) in diameter and 0.006 inch (0.152 mm.) in length. A portion extruded directly into air reached a stable diameter of 0.055 inch (1.40 mm.) at a density of 0.043 gm./cc.

Specimens were removed from the plasticizing fluid after about 15 seconds immersion time and transferred to the booster fluid (the methylene chloride-rich liquid phase of a boiling, liquid, two-phase mixture of perfluorocyclobutane in methylene chloride). Immersion times in this booster fluid ranged from 2 to 10 minutes. Removed from booster fluid, each specimen was sprayed for about one minute with a steam/air mixture at about 75–80° C., and then it was dried and inflated by exposure for 1 minute to air at 125° C. with an air-velocity of about 2000 ft./min. (610 m./min.). Results of this test are shown in Table V.

TABLE V.—15-SECOND IMMERSION IN PLASTICIZING FLUID

| Test | Minutes in booster fluid | Perfluorocyclobutane (gm./100 gm.) | Stable density (gm./cc.) |
|---|---|---|---|
| Q | 2 | 5.2, 4.6 | 0.036, 0.041 |
| R | 5 | 9.0, 12.7 | 0.026, 0.022 |
| S | 10 | 14.9, 13.5 | 0.020, 0.022 |

These tests show that the process of this invention can be directly coupled with the process for originally forming the cellular material.

EXAMPLE VI

A larger-scale coupled process according to this invention is described.

The filaments were prepared by extruding a solution containing 65 parts of polyethylene terephthalate (RV = 51.2) and 35 parts of methylene chloride at 213–217° C. and under 950 p.s.i.g. (66.8 kg./cm.$^2$ gage) through an orifice 0.012 inch (0.305 mm.) in both diameter and length into the ambient atmosphere. Just below the extrusion orifice a rotating blade cut the filament into approximately 5-inch (12.7 cm.) staple lengths while it was still fully inflated at a filament-diameter of about 0.070 inch (1.78 mm.). Thereafter, it rapidly collapsed to a stable density of about 0.10 gm./cc.

About 120 gm. of this collapsed staple were placed in an open box 1.5 feet (about 0.46 m.) square with base and sides of stainless steel screening. The bed thickness was about 4 inches (10 cm.), and the bed loading was about 0.12 lb./ft.$^2$ (0.58 kg./m.$^2$). The box was moved into a chamber where it was sprayed for 15 seconds with methylene chloride at 36° C. and at a rate of about 0.7 gal./min. (2.6 liter/min.). From this chamber it was moved into another containing a gaseous atmosphere of about 88% perfluorocyclobutane and 12% methylene chloride. Residence time in this second chamber was 12 minutes during which time the staple was intermittently sprayed (about 20% of the residence time) with a saturated liquid solution of perfluorocyclobutane in methylene chloride, this latter solution at −6° C. and under atmospheric pressure. This spray-rate was about 0.2 gal./min. (0.75 liter/min.). The box was quickly transferred to a third chamber where the contents were showered from above and below with saturated steam at 100° C. for 1 minute. Steam flow-rate was about 120 lb./hr. (54.5 kg./hr.). Finally, the box was placed in a chamber through which air at 125° C. was passing at about 300 ft./min. (91 m./min.) for about 2 minutes. The inflated staple thus obtained had a density of about 0.023 gm./cc. and contained 14 grams of perfluorocyclobutane per 100 grams of polymer.

EXAMPLE VII

The advantages of employing a third step (e.g., vessel 30 of FIG. 1) for removing excess booster fluid from the surfaces of the cellular structure are shown.

Ultramicrocellular filaments were prepared by extruding into the ambient atmosphere a solution composed of 65 parts of polyethylene terephthalate (RV=54) and 35 parts of methylene chloride. The solution at 215° C. and 900 p.s.i.g. (63.3 kg./cm.² gage) was passed through an orifice 0.012 inch (0.305 mm.) in diameter and 0.006 inch (0.152 mm.) in length. The extruded filaments were initially fully expanded but soon collapsed to a stable density of 0.12 gm./cc. They were left at room temperature for at least 4 weeks before subsequent treatment.

Each of various portions of this filament was first immersed for 20 seconds in boiling methylene chloride and then quickly transferred to the booster fluid where it remained immersed for 10 minutes. The booster fluid was a two-phase liquid composed of perfluorocyclobutane and methylene chloride boiling at −6° C. under atmospheric pressure. Immersion was in the methylene chloride-rich phase.

Measurements showed that the filament portions, on removal from the booster fluid, carried along about 720 gm. of methylene chloride and about 80 gm. of perfluorocyclobutane per 100 gm. of polymer. The methylene chloride has to be removed quickly to terminate plasticization, and excesses of both fluids must be substantially reclaimed in economical commercial production. Adequate removal of plasticizing and excess inflatant fluids was demonstrated in three ways.

A. The portion of filament was immediately placed for 30 seconds in an atmosphere of steam at 100° C. On removal, the filament retained only 4.9 gm. of methylene chloride and more than 13 gm. of perfluorocyclobutane per 100 gm. of polymer.

B. The portion of filament was immediately immersed in water saturated with methylene chloride at 25° C., and agitated in this bath for 30 seconds. On removal, the filament retained 7.5 gm. of methylene chloride and more than 13 gm. of perfluorocyclobutane per 100 gm. of polymer.

C. The portion of filament was immediately immersed for 30 seconds in water at 52° C. Upon removal, the filament retained 7.5 gm. of methylene chloride and more than 13 gm. of perfluorocyclobutane per 100 gm. of polymer.

Each of these methods is seen to efficiently remove the excess fluid present on removal from the booster fluid, to make possible reclaiming the fluids, and to leave unchanged the amount of impermeant inflatant retained within the closed cells.

EXAMPLE VIII

Portions of collapsed filaments prepared according to Example VII—Procedure A were inflated by exposure to air. In this final treatment, a bundle of each filament portion was held in a stream of air at known temperature and velocity, densities being determined periodically until the minimum density of about 0.02 gm./cc. was achieved. Air-temperatures were from 25 to 175° C., and air-velocities from 0 to 2000 ft./min. (0–610 m./min.). FIGURE 3 shows the response of these filament portions to still air at about 25° C. FIGURE 4 shows the response to varying air-temperatures at constant air velocity, i.e., between 1000 and 2000 ft./min. (305 and 610 m./min.). FIGURE 5 shows the response to varying air-velocities during exposure to air at 175° C. for 5 minutes. From examination of these figures it is apparent that the rate at which these filaments achieved their maximum volume increased with both increasing air-temperature and increasing air-velocity. In all cases the filaments retained about 15 gm. of perfluorocyclobutane per 100 gm. of polymer. FIGURES 4 and 5 appear to be in discrepancy, but these results were obtained from separate post-inflation experiments for which the experimental errors in volume measurement near 100% of maximum volume were substantially as great as the volume differences being determined. The effects of the various treatments are accurately shown; the absolute times for attaining exactly 100% volume inflation are uncertain.

EXAMPLE IX

A microcellular polyvinyl chloride filament was post-inflated according to the process of this invention.

The closed-cell filament was prepared by extruding a foamable composition into the ambient atmosphere through a single orifice 0.020 inch (0.508 mm.) in diameter and 0.040 inch (1.016 mm.) in length. The foamable composition was at 169° C. and 1300 p.s.i.g. (91.5 kg./cm.² gage) before passage through the orifice, and had been filtered through a 50, 100, 50-mesh screen pack (U.S. Sieve Series).

The foamable composition was 50.5% by weight in fully compounded high-molecular-weight (specific gravity 1.34 polyvinyl chloride (Dacovyn 3010-natural polyvinyl chloride blow-molding compound supplied by the Diamond Alkali Co.). After it was melted in a screw-extruder, it passed to a mixing zone of the extruder where a liquid dispersion was injected and thoroughly blended. The liquid dispersion was 90% methylene chloride and 10% trichlorofluoromethane to which had been added 0.5% by weight each of Santocel-54 silica aerogel (Monsanto Chemical Co.) and n-butyl alcohol. Immediately after passage through the orifice, the foamed filament was fully inflated, but soon thereafter it spontaneously collapsed to a density of about 0.065 gm./cc.

Different portions of this filament were post-inflated in paired experiments with and without immersion in a plasticizing fluid. The plasticizing fluid was liquid dichlorofluoromethane boiling at about 9° C. The booster fluid was composed of 20 parts by volume (at −6° C.) of perfluorocyclobutane impermeant inflatant and 80 parts by volume (at 9° C.) of dichlorofluoromethane. On removal from booster fluid, each portion was reinflated by a 15-minute exposure to air at 70° C. Sixteen days later the content (in gm./100 gm. of polymer) of perfluorocyclobutane was determined by the melted-film technique already described. Results are shown in Table VI.

TABLE VI.—POST-INFLATION OF POLYVINYL CHLORIDE FOAM

| | Boosting Time (min.) | Impermeant Inflatant (gm./100 gm.) | Density (gm./cc.) |
|---|---|---|---|
| Plasticizing Time (sec.): | | | |
| 0 | 5 | 3.2, 3.0 | 0.019, 0.019 |
| 15 | 5 | 7.0, 4.6 | 0.014, 0.015 |
| 0 | 10 | 6.8, 5.9 | 0.016, 0.016 |
| 15 | 10 | 6.8, 7.1 | 0.014, 0.016 |
| 0 | 15 | 8.4, 8.5 | 0.015, 0.015 |
| 15 | 15 | 10.6, 9.7 | 0.014, 0.013 |

From Table VI it is obvious that preplasticization resulted in the introduction of more perfluorocyclobutane impermeant inflatant in each paired experiment. Density of the fully inflated filament was about 0.015 gm./cc.

EXAMPLE X

Post-inflation according to this invention is shown for a nylon-6 microcellular filament having thin cell walls and small polyhedral-shaped cells with transverse dimensions in the range of 500–1000 microns. A 300 ml. pressure vessel was charged with 100 gm. of 10-mesh (U.S. Sieve Series) nylon-6 previously dried under vacuum for 24 hours at 110° C. Relative viscosity at 25° C. for an 8.4% solution in 90% formic acid was 140. Then 33 ml. of methyl alcohol were added, and 100 p.s.i.g. (7.0 kg./cm.² gage) of nitrogen pressure was applied to the contents before the vessel was closed. Mixing of the contents occurred during the hour required to raise the temperature to 195° C. Autogenous pressure was 500 p.s.i.g. (35.2 kg./cm.² gage) at that point; but, with the discharge end of the vessel directed downward, the top was connected to a 600 p.s.i.g. (42.2 kg./cm.² gage) ballast of nitrogen pressure and the contents were extruded into the ambient atmosphere through an orifice 0.025 inch (0.635 mm.) in both diameter and length. The collapsed cellular filament obtained had a density of 0.0733 gm./ml.

A portion of the above product was immersed for 2–3 minutes in plasticizing fluid (liquid methyl alcohol boiling at atmospheric pressure), cooled for 1 minute in the atmosphere, transferred to the liquid booster fluid (trichlorofluoromethane at room temperature) for 30 minutes, and heated for 10 minutes in air at 10° C. The filament became fully inflated to a density of about 0.0149 gm./ml. Although trichlorofluoromethane permeates the cell walls more slowly than air, it is not a substantially permanently retained inflatant. Preferred perfluorocyclobutane was introduced to the cells by immersion in liquid perfluorocyclobutane between the steps of immersion in trichlorofluoromethane and of heating in air.

What is claimed is:

1. Method for introducing an impermeant inflatant into the closed cells of a low-density cellular structure formed of a film-forming high-molecular-weight polymer, said cellular structure having a major proportion of closed cells defined by gas-permeable walls and being characterized in that it is yieldable such that substantial deformation occurs under externally applied pressures, which method comprises the steps of (1) exposing said cellular structure to a non-solvent, volatile, plasticizing fluid at a temperature equal to or less than its normal boiling point, (2) transferring the structure, while still wet with and plasticized by the plasticizing fluid, to a fluid bath comprising impermeant inflatant, and (3) exposing the structure to an air atmosphere.

2. The method of claim 1 wherein said polymeric cellular structure is an ultramicrocellular structure of a crystalline organic polymer having substantially all the polymer present as filmy elements of a thickness less than 2 microns, with the polymer in the cell walls exhibiting uniplanar orientation and a uniform texture.

3. The method of claim 1 wherein intermediate to steps (2) and (3) the cellular structure is bathed in a non-solvent, inert fluid to remove excess plasticizing fluid and impermeant inflatant from the surface thereof.

4. The method of claim 1 wherein all steps are performed at atmospheric pressure.

5. The method of claim 1 wherein said air atmosphere is at a temperature from 80 to 175° C. and circulates at a high velocity about the cellular structure.

6. Method according to claim 1 wherein said polymer is polyethylene terephthalate and said plasticizing fluid is methylene chloride.

7. Method according to claim 6 wherein said impermeant inflatant is perfluorocyclobutane.

8. Method according to claim 1 wherein the impermeant inflatant is used in solution with said plasticizing fluid.

9. Method according to claim 8 wherein said solution is composed of at least about 9 percent by weight of perfluorocyclobutane and no more than 91 percent by weight of methylene chloride, said liquid boiling at about −6° C. at atmospheric pressure and being in equilibrium with its vapor.

References Cited
UNITED STATES PATENTS

| | | | |
|---|---|---|---|
| 2,659,935 | 11/1953 | Hammon | 264—321 |
| 2,746,088 | 5/1956 | Lindemann et al. | 264—54 |
| 2,795,008 | 6/1957 | Lindemann et al. | 264—54 |
| 3,126,432 | 3/1964 | Schuur | 264—53 |
| 3,189,669 | 6/1965 | Goldfein | 264—321 XR |
| 3,192,300 | 6/1965 | Pehn | 264—321 XR |
| 3,202,998 | 8/1965 | Hoffman | 343—833 |
| 3,227,784 | 1/1966 | Blades et al. | 264—53 |
| 3,344,221 | 9/1967 | Moody et al. | 264—321 |

MURRAY TILLMAN, *Primary Examiner.*

M. FOELAK, *Assistant Examiner.*